July 26, 1966

W. RAINER 3,263,168

STOPPING DEVICE FOR A TIME MEASURING
APPARATUS, PARTICULARLY
FOR SWIMMING RACES
Filed Oct. 5, 1962

INVENTOR.
Walter Rainer
BY Ernest Montague
Attorney

United States Patent Office 3,263,168
Patented July 26, 1966

3,263,168
STOPPING DEVICE FOR A TIME MEASURING APPARATUS, PARTICULARLY FOR SWIMMING RACES
Walter Rainer, Dornbirn, Vorarlberg, Austria, assignor to Wilhelm J. Hanhart, Vernate, Ticino, Switzerland
Filed Oct. 5, 1962, Ser. No. 228,675
4 Claims. (Cl. 324—70)

The present invention relates to a stopping device for a time measuring apparatus, particularly for swimming races.

According to the present practice, the start of the swimmers participating in a swimming race takes place in response to the discharge of a starting pistol, in which contacts may be incorporated which operate a relay provided with self-holding contacts to start a stop watch.

The time-keeping at the goal is manually effected by the timekeepers. According to the international rules for competitions presently in force, at least three timekeepers must be provided for each lane. The mean value of the times stopped by hand by the timekeepers is then calculated.

This method of time-keeping enables subjective errors in measurement and is fairly expensive because, e.g., eighteen timekeepers are provided for six lanes.

It is, therefore, one object of the present invention to provide means for application of the known principle of measuring the time required by a moving body for traversing a certain path by causing this body to initiate switching operations at the end and, if desired, at the beginning of this path, which switching operations control the movement of a time meter. This enables an elimination of subjective errors in measurement.

The releasing devices which have been disclosed in connection with the principle of measurement described above, e.g., photo-electrically or pneumatically controlled switches, are not suitable for time-keeping in swimming races, because false indications due to the waves of the water cannot be avoided with these known releasing devices.

It is another object of the present invention to provide a stopping device which avoids the drawbacks of the known devices such, that the releasing device of the time meter includes two electrodes connected in a switching circuit for actuating the device at the end of the movement to be measured, which electrodes are disposed in the liquid, which has a low electrical conductivity, and are spaced apart in the direction of movement of the swimming body, one of the electrodes being fixed relative to the swimming lane and the other electrode, which faces the swimming body, being arranged to be movable relative to the fixed electrode.

It is still another object of the present invention to provide a stopping device, wherein the electrodes are connected in an electrical switching circuit in series with a relay, the operation of which causes the operation of the time meter to be controlled, and a direct-current voltage source. In a liquid of low conductivity, e.g., in ordinary water containing anions and cations, the electrical resistance between the electrodes is directly proportional to the distance between the two electrodes.

In the present case, the electrical values of the switching circuit are selected such that the relay will not operate, when the electrodes are spaced apart by the normal distance, whereas the relay will operate when the resistance between the electrode is reduced, because the electrodes approach each other. This approach of the electrodes, which causes the relay to operate and the time meter to be stopped, will occur when the swimming body impinges on the movable electrode.

In time measuring devices for sport competitions, the fixed electrode may preferably consist of a metal tub, which contacts the wall of the swimming basin, and the movable electrode may consist of a series of wire ropes which extend partly under and partly over the surface of the water.

Various types of releasing devices may be used for initiating the switching operation, by which the time meter is started upon the starting of the swimmers. A releasing device may consist, e.g., of a pair of starting contacts which are included in a switching circuit and are disposed, e.g., on contact plates carried by the starting block and operable by the feet of the swimmer, so that the contacts are closed before the start, whereas they are caused to open by a spring element at the time of the start. This causes the switching circuit to be interrupted and a relay is provided to operate such that the time meter is started.

With these and other objects in view, which will become apparent in the following detailed description, the present invention will be clearly understood in connection with the accompanying drawing, in which:

FIG. 2 is an elevation showing a starting block provided with a foot-operable contact plate; and FIGS. 3 and 4, respectively, are front and side elevations, showing an electrode arrangement at the end of a swimming lane, with a diagrammatic showing of the switching circuit for time-keeping.

Figure 1:
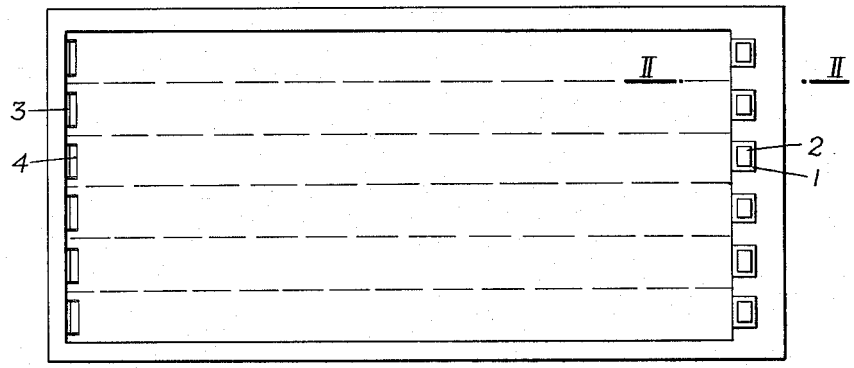
FIGURE 1 is a diagrammatic top plan view showing a swimming basin for swimming races.
Figure 1:
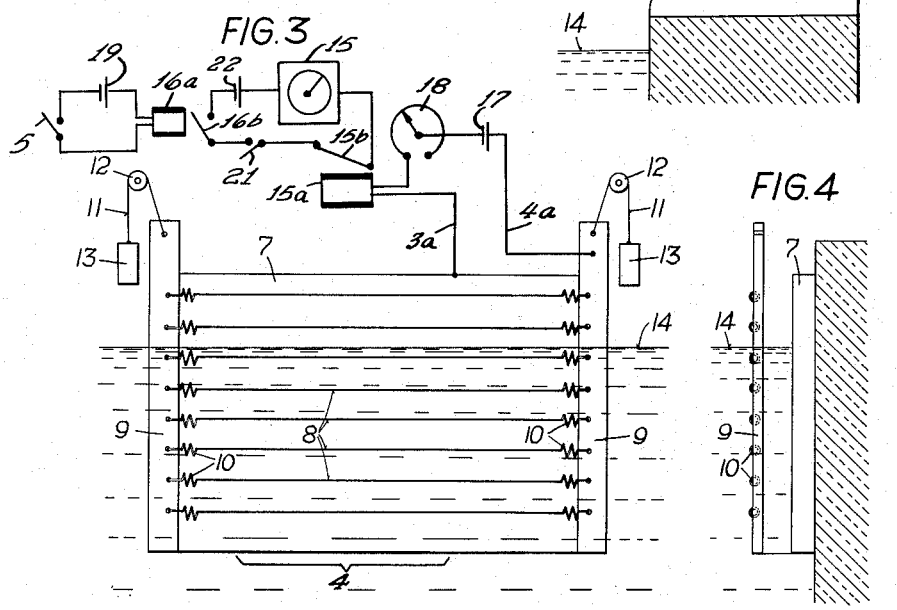

Referring now to the drawing, the swimming basin shown in FIG. 1, has six swimming lanes. A starting block 1 is disposed at one end of each of the swimming paths and each of the starting blocks 1 carries foot-operable contact plates 2. As shown in FIG. 2, the starting block 1 has a top face which is inclined towards the basin. The contact plates 2 are connected at their upper edge with the starting block 1.

As is shown in FIG. 2, the foot-operable contact plates have starting contacts 5, secured to the upper side of the starting block 1, the bottom side of the contact plate 2, which starting contacts 5 are urged apart by a spring element 6, when the foot-operable contact plates 2 are unloaded.

At the ends of the swimming lanes disposed opposite the starting blocks 1 are disposed two electrodes 3 and 4 of a device for stopping a time measuring device. The electrode 3 is designed as a flat tub 7, the opening of which is arranged opposite the wall of the basin, while the electrode 4 is designed as a frame, which carries a net of wire ropes 8, as is set forth below in connection with FIG. 3.

The electrode arrangement at the end of the swimming lane is shown particularly clearly in FIGS. 3 and 4. Thus, the fixed electrode 3 consists of a tub 7 of metal, which contacts the wall of the swimming basin, and the movable electrode 4 consists of a series of horizontal wire ropes 8, 1.5 mm. in diameter, which are spaced 5–10 mm. apart and are connected to vertical supports 9 by means of springs 10. The tub 7, which comprises electrically conducting material, is secured to the wall of the basin. In order to perform its function as an electrode, it is, as is apparent in FIG. 3 of the drawing, connected with a relay 15a, by means of an electrical conduit 3a, the relay 15a being disposed in the circuit for stopping of a time measuring device 15. Supports 9, which are likely designed as a frame of electrically conducting material, are suspended from ropes 11, which extend around deflecting pulleys 12 and carry weights 13 at their free end. Some of the wire ropes 8 are disposed below the surface 14 of the water and some are disposed above this surface. Due to the suspension of the electrode 4 by means of the ropes 11, one end of which is always secured to the frame 9 and which ropes 11 are guided over the deflecting pulleys 12, while the other end of the ropes 11 carries weights 13, the electrode 4 is rendered easily movable and can be pressed toward the tub 7 without difficulty.

FIG. 3 shows also switching circuits by which the movement of the timekeeper or time measuring means 15, e.g., a spark radiation recorder, is started or stopped. In the starting switching circuit, the switch 16b, the contacts of which are operated by the starting contacts 5 of the foot-operable contact plates 2 (FIG. 2), is connected in series with a contact 15b controlled by a relay 15a and the time meter 15, as well as a direct current voltage source 22 and a switch 21. The stopping switching circuit includes the resistance between the electrodes (wire ropes 8, tub 7) in series with the relay 15a the rheostat 18 and the direct-current voltage source 17 which feeds the relay 15a. The direct-current voltage source 17 has a tension of 6 volts. The switch 16b which is normally in closed position, is operated by a relay 16a, disposed in an additional circuit including a direct current source 19, as well as the starting contacts 5.

The movable electrode 4 comprising the wire ropes 8, is immersed in the water so such an extent that the resistance between all wire ropes 8 and the tub 7 of the fixed electrode 3 is about 250 ohms. The resistance is adjusted with a rheostat 18 connected in series with the electrodes 3 and 4 and the direct-current voltage source 17.

The relay will not operate until the resistance has been reduced to 50 ohms. This reduction of the resistance required to operate the relay is effected when the swimmer arriving at the end of the swimming lane contacts the wire ropes 8 and moves the latter toward or into contact with the tub 7. Thus, a conductive path between the wire ropes 8 and the tub 7 will be established, having a resistance less than 50 ohms, in order to ensure a reliable operation of the relay 15a.

The apparatus operates in the following manner:

If the swimmer steps on the contact plates 2, the starting contacts 5 are closed, thereby closing the circuit which includes the direct current source 19 and feeds the relay 16a. The latter opens the switch 16b. The switch 21 is then closed by an operator. If now the swimmer jumps off the contact plates 2, the springs 6 open the starting contacts 5. Since the relay 16a is now without current, the switch 16b resumes its closed position, simultaneously closing the circuit for the time measuring instrument 15 and the latter starts the time count. If the swimmer reaches the opposite end of the swimming lane, he operates the electrode 4, which changes jointly with the immovable electrode 7 the resistance of the circuit including the relay 15a, whereby the latter is excited and opens the contact 15b. The circuit including the time measuring element 15 is then interrupted and the time measuring instrument stops.

The described time measuring apparatus enables a time-keeping or time-measuring which is independent of subjective errors in swimming races. A special circuitry will enable a direct indication of the shortest time measured.

The present invention is not restricted to the described application for swimming races.

Nor is the invention restricted to the structural features of the embodiment described by way of example.

While I have disclosed one embodiment of the present invention, it is to be understood that this embodiment is given by example only and not in a limiting sense, the scope of the present invention being determined by the objects and the claims.

I claim:

1. A stopping device for a time measuring apparatus, particularly for swimming races for a plurality of swimming lanes, comprising
   a time measuring means,
   means for starting and stopping, respectively, said time measuring means,
   said starting means being disposed at the start of said swimming lanes comprising a first circuit including in series said time measuring means, a circuit closing switch adapted to be closed to initiate the operation of said time measuring means and a relay responsive switch normally in closed position, and
   a second circuit including in series a voltage source, a rheostat, a relay opening said relay responsive switch, a fixed electrode and a movable electrode being adapted to engage said fixed electrode at the end of the time period to be measured, said stopping means being disposed at the end of said swimming lanes opposite the start thereof,
   said voltage source establishing a predetermined potential difference between said electrodes,
   a body of water,
   said electrodes being at least partly submerged in said body of water and spaced apart from each other at a distance sufficient to prevent a closing of said second circuit at the given voltage from said voltage source,
   said relay cooperating with said relay responsive switch of said first circuit, so that said relay is rendered operative upon contact between said electrodes, thereby operating said relay responsive switch and opening said first circuit.

2. The stopping device, as set forth in claim 1, wherein said voltage source is a direct-current voltage source having a voltage of about 6 volts.

3. The stopping device, as set forth in claim 1, wherein said fixed electrode comprises a metal tub, and said movable electrode comprises a plurality of wire ropes adapted to be moved by a swimming body toward said fixed electrode.

4. The stopping device, as set forth in claim 3, which includes
   support means for said wire ropes, and
   resilient means connecting said wire ropes with said support means.

References Cited by the Examiner
UNITED STATES PATENTS

| | | | |
|---|---|---|---|
| 1,630,808 | 5/1927 | Siegerdt | 200—61.93 |
| 2,058,211 | 10/1936 | Brown | 324—68 |
| 2,587,775 | 3/1952 | Sheldon et al. | 324—70 |

RICHARD B. WILKINSON, *Primary Examiner.*

FREDERICK M. STRADER, *Examiner.*

C. W. HOFFMANN, M. J. LYNCH, *Assistant Examiners.*